(12) United States Patent
Migdal

(10) Patent No.: US 12,406,266 B2
(45) Date of Patent: Sep. 2, 2025

(54) IMAGE-BASED PRODUCE RECOGNITION AND VERIFICATION

(71) Applicant: NCR Voyix Corporation, Atlanta, GA (US)

(72) Inventor: Joshua Migdal, Wayland, MA (US)

(73) Assignee: NCR Voyix Corporation, Atlanta, GA (US)

( * ) Notice: Subject to any disclaimer, the term of this patent is extended or adjusted under 35 U.S.C. 154(b) by 113 days.

(21) Appl. No.: 17/186,461

(22) Filed: Feb. 26, 2021

(65) Prior Publication Data

US 2022/0277313 A1    Sep. 1, 2022

(51) Int. Cl.
| | |
|---|---|
| G06Q 30/02 | (2023.01) |
| G06K 7/14 | (2006.01) |
| G06N 3/08 | (2023.01) |
| G06N 5/04 | (2023.01) |
| G06N 7/01 | (2023.01) |
| G06Q 20/18 | (2012.01) |
| G06Q 20/20 | (2012.01) |
| G06Q 30/018 | (2023.01) |

(52) U.S. Cl.
CPC ......... *G06Q 30/018* (2013.01); *G06K 7/1413* (2013.01); *G06N 3/08* (2013.01); *G06N 5/04* (2013.01); *G06N 7/01* (2023.01); *G06Q 20/18* (2013.01); *G06Q 20/20* (2013.01)

(58) Field of Classification Search
CPC ............... G06Q 30/018; G06Q 10/087; G06Q 30/0201; G06Q 20/20; G06K 9/62; G06K 7/1413; G06N 20/00; G06N 3/08; G06N 7/01; G06N 5/04; G06N 3/0464; G06N 3/045

See application file for complete search history.

(56) References Cited

U.S. PATENT DOCUMENTS

| | | | |
|---|---|---|---|
| 9,047,742 B2 * | 6/2015 | Connell | G07G 1/0018 |
| 9,811,816 B2 * | 11/2017 | Sato | G06V 20/52 |
| 11,208,134 B2 * | 12/2021 | Carter | B62B 5/0423 |
| 2019/0138381 A1 * | 5/2019 | Akella | G05B 19/4183 |
| 2019/0220692 A1 * | 7/2019 | Wu | G06F 18/00 |
| 2019/0236363 A1 * | 8/2019 | Bacelis | G06V 20/52 |
| 2019/0251612 A1 * | 8/2019 | Fang | G06Q 30/0643 |
| 2019/0318417 A1 * | 10/2019 | Gumaru | G06Q 30/0635 |
| 2020/0356591 A1 * | 11/2020 | Yada | G06F 3/04855 |
| 2023/0057000 A1 * | 2/2023 | Abadi | G06V 30/2247 |
| 2023/0095037 A1 * | 3/2023 | Slaughter | G06N 20/10 705/23 |

* cited by examiner

*Primary Examiner* — Florian M Zeender
*Assistant Examiner* — Milena Racic
(74) *Attorney, Agent, or Firm* — Schwegman Lundberg & Woessner, P.A.

(57) ABSTRACT

An image of a candidate produce item is received during a transaction at a transaction terminal. A Feature Vector (FV) for the image is produced. Sales data associated with Produce Look Up (PLU) codes is obtained. Bayesian produce recognition engines are provided the FV and the corresponding sales data. Probabilities returned by the engines are evaluated and a pick list of produce items are produced and/or an entered PLU code provided by an operator of the terminal during the transaction for the candidate produce item is verified or identified as counterfeit.

15 Claims, 5 Drawing Sheets

- Making picklist predictions: $P(p|I)$
  - $P(p|I) = \left[\sum_{c \in C} P(c|I) \frac{P(c|p)}{P(c)}\right] P(p)$  160
    - feature vector from CNN
    - prior on class c
    - avg FV of images of p from CNN
    - prior on plu p
  - $P(c|I)$: run image through CNN (FV)
  - $P(c)$: sum all elements of FV from all images in dataset
  - $P(c|p)$: run all images of plu through CNN. Sum all elements. Collect for each plu separately
  - $P(p)$: sum all # sales of each plu

FIG. 1C

IMAGE-BASED PRODUCE RECOGNITION AND VERIFICATION

BACKGROUND

One of the more difficult tasks to perform when using a retail self-checkout (SCO or Self-Service Terminals (SSTs)) is to enter into the interface the Produce Look-Up code (PLU) of a fruit or a vegetable. Unlike packaged goods, which typically contain a machine-readable barcode, either a Stock Keeping Unit (SKU) number or a Universal Product Code (UPC) symbol, produce is regularly purchased in bags and is identified by a PLU code. This PLU code is often found on a sticker that is affixed to the produce. But it often is not, or it is not on every piece of produce, or the customer does not know what the sticker is used for. Thus, when the customer uses the SCO/SST to check out, he/she will get stuck in the process when attempting to enter in the produce they are looking to purchase.

There are existing tools used to facilitate the entry of the PLU into the SCO/SST. For instance, there are tables of produce published in a book or pamphlet that a person can use to look up their produce based on appearance or category. This involves the customer looking up the produce, as in an index to a dictionary or encyclopedia. There are also on-screen guides that help facilitate the same lookup task. These have a number of drawbacks. For one, there are a great many potential fruits and vegetables that will need to be searched through to find the single one that matches the customer's purchase. In a 4-digit PLU code, for instance, there are 10,000 different possibilities. Looking these up manually takes a significant amount of time. Furthermore, to a customer not trained in looking up produce, the task becomes even more difficult as they are not accustomed to performing it.

Recently, there have been computer vision approaches developed that will take a picture of the produce using a digital camera, such as a webcam or Internet Protocol (IP) camera, and present a set of matches to the customer to help drill down to a handful of choices. Ideally, the customer's own produce is on that short list and this facilitates the lookup. These approaches have great potential to simplify the task.

However, existing implementations fall short. They often don't present a list of choices that are helpful. Sometimes, their performance is confusing. Furthermore, they require significant work on the part of the retailer, who often will need to perform manual maintenance of database of produce entries and may need to do explicit training for new or existing produce. Furthermore, such systems are trained individually per SCO/SST or per store, limiting the ability to share imagery and models between systems.

Moreover, produce identification and verification is also associated with significant theft sustained by the retailer. Because customers can enter their own PLU code, the customers have the ability to intentionally enter a wrong PLU code associated with less expensive produce than what is actually being purchased. In fact, sometimes a customer will place an expensive non-produce item on the terminal's weigh scale and then enter a PLU code resulting in significantly loss for the retailer.

Thus, accurate produce recognition and verification presents many issues for retailers which the existing approaches fail to adequately remedy.

SUMMARY

In various embodiments, methods and a system for image-based produce recognition and verification are presented.

According to an embodiment, a method for image-based produce recognition and verification is presented. A feature vector is produced from an item image captured for an item during a transaction at a transaction terminal. The feature vector is weighted based on transaction history data for an entered item code received from the transaction terminal for the item or for available item codes that are available to the transaction terminal. A list of candidate item codes is provided based on the feature vector and the weights or a verification is provided for the item based on the entered item code, the feature vector, and the weights.

BRIEF DESCRIPTION OF THE DRAWINGS

FIG. 1C is a diagram of an equation for a Bayesian Inference engine for image-based produce recognition and verification, according to an example embodiment.

DETAILED DESCRIPTION

Figure 1A:
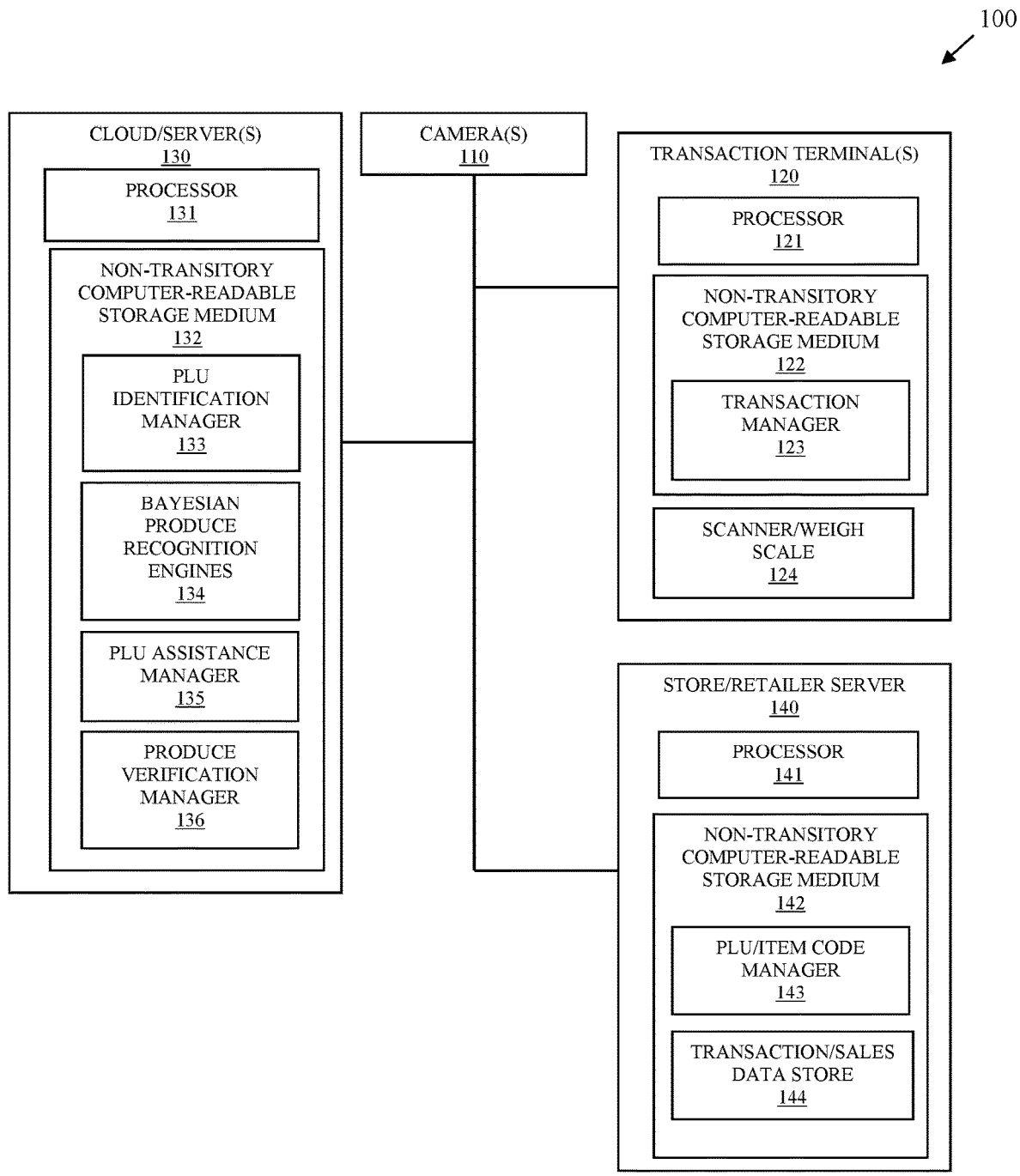
FIG. 1A is a diagram of a system for image-based produce recognition and verification, according to an example embodiment.

FIG. 1A is a diagram of a system 100 for image-based produce recognition and verification, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of image-based produce recognition and verification, presented herein and below.

System 100 comprises one or more cameras 110, one or more transaction terminals 120, one or more clouds/servers 130, and one or more store/retailer servers 140.

The camera(s) 110 captures video and/or images of produce items placed on weigh scales 124 of transaction terminal 120. The video and/or images are streamed in real time to cloud/server 120 or any other network location or network file accessible to cloud/server 120. For example, the video/images may be streamed to a local server location within a given store/retailer server 140 and cloud/server 120 detects when the video/image is written to the local server location and obtains the video/images when needed for produce recognition and verification during a transaction at the transaction terminal 120.

Each transaction terminal 120 comprises a processor 121, a non-transitory computer-readable storage medium 122, and a scanner/weigh scale 124 (this may be a single combined scanner and scale or two separate devices one for the scanner and one for the scale). Medium 122 comprises executable instructions representing a transaction manager 123. Transaction manager 123 when executed by processor 121 from medium 122 causes processor 121 to perform operations discussed herein and below with respect to transaction manager 123.

It is to be noted that each transaction terminal 120 may comprise various other peripherals such as and by way of example only, a touchscreen display, a keypad, a Personal Identification Number (PIN) pad, a receipt printer, a currency acceptor, a coin acceptor, a currency dispenser, a coin dispenser, a valuable media depository, a card reader (contact-based (magnetic and/or chip) card reader and/or contactless (wireless) card reader (Near-Field Communication (NFC), etc.)), one or more integrated cameras, a bagging weigh scale, a microphone, a speaker, a terminal status pole with integrated lights, etc.

Server 130 comprises a processor 131 and a non-transitory computer-readable storage medium 132. Medium 132 comprises executable instructions for a Produce Look Up (PLU) identification manager 133, Bayesian produce recognition engines 134, a PLU assistance manager 135, and PLU verification manager 136.

The executable instructions 133-136 when executed by processor 131 from medium 132 causes processor 131 to perform operations discussed herein and below with respect to 133-136.

As will be illustrated more completely herein and below, system 100 permits a fast, an efficient, and an accurate mechanism for providing an accurate pick list of potential produce items for presentation by transaction manager 123 during a transaction at terminal 120 and for selection by an operator of terminal 120 (a customer when terminal 120 is a SST and a clerk/cashier when terminal 120 is a POS terminal). System 100 also provides a verification of an entered PLU code during a transaction to prevent fraudulent entries by the operator when the item placed on weigh scale 124 is either a non-produce item or is associated with a different PLU code than what was provided with the entered PLU code. The system 100 can be leveraged/shared across a plurality of disparate retailers and a plurality of stores associated with each retailer for purposes of quickly and accurately identifying and verifying produce items during transactions at terminals 120.

During a transaction at terminal 120, an operator of terminal 120 either places an item on weigh scale 124 or accesses an option within a transaction interface portion of transaction manager 123 to indicate that produce is being purchased. Camera 110 or embedded cameras within scanner 124 snap one or more images of the item. In an embodiment, at least one camera 110 associated with at least one of the images captured is captured by an overhead camera 110 focused down on the top surface of weigh scale 124.

Transaction manager 123 uses an Application Programming Interface (API) to send the image or images to PLU identification manager 133 over a network connection or transaction manager 123 sends a notification to PLU identification manager 133, such that manager 133 can obtain the image or images separately from transaction manager 123. The API interactions between transaction manager 123 and PLU identification manager 133 may also include an identifier for a retailer associated with transaction terminal 120, an identifier for a store associated with the retailer, an identifier for terminal 120, and/or a transaction identifier for the transaction.

Alternatively, transaction manager 123 indirectly through store/retailer server 140 communicates the transaction at terminal 120 is in a state where an item was placed on weigh scale 124 or in a state where the operator is expected to enter a PLU code for the item. In this scenario, store/retailer server 140 using an API to communicate with PLU identification manager 133 and provide a notice of the images, the images, and/or terminal identifier with transaction identifier.

Other approaches may be used as well for PLU identification manager 133 to receive notice of the item images and the transaction at terminal 120. For example, the images may be stamped with terminal identifier and a time of day and the images are detected when received in a storage buffer or file by PLU identification manager 133.

Once PLU identification manager 133 has the images for the transaction being processed on terminal 120, the image or set of images are fed through a trained Convolutional Neural Network (CNN) model that is trained to provide as output a low-dimensional, highly discriminative Feature Vector (FV).

PLU identification manager 133 obtains sales data from transaction/sales data store 144 of store/retailer server 140. The sales data corresponds to total sales by each PLU code of the retailer. Note the store's sales data by PLU code may be retained on cloud 130 and updated periodically to synchronize with transaction/sales data store 144, such that access to obtain the PLU sales data does not have to be a network transaction during the transaction at terminal 120.

Each PLU code is associated with its own trained Bayesian inference machine-learning model (Bayesian produce recognition engine 134). PLU identification manager 133 provides the FV and the corresponding sales data to the corresponding trained Bayesian produce recognition engine 134. Each Bayesian produce recognition engine 134 returns as output a confidence value or percentage that the FV and relevant sales data matches the PLU code associated with that Bayesian produce recognition engine 134.

Next, PLU assistance manager 135 assembles the confidence values returned by each Bayesian produce recognition engine 134. Any confidence value that is above a preconfigured threshold is considered to be an option or a candidate for a produce selection that identifies the item. The list of PLU codes that remain after the threshold evaluation are returned back to transaction manager 123 as a pick list. Transaction manager 123 obtains images associated with each PLU code in the pick list and presents it as options for selection by the operator for the item (produce item pick list).

In an embodiment, the list of PLU codes are sorted in ranked order based on the threshold evaluation before being sent to transaction manager 123.

In an embodiment, the produce item images associated with each PLU code are included within the pick list when PLU assistance manager 135 sends the pick list to transaction manager 123.

In an embodiment, links to the produce item images are included within the pick list that is sent by the PLU assistance manager 135 to transaction manager 123.

System 100 can also operate along a different workflow from what was discussed above, when an operator of terminal 120 enters a PLU code for the item under consideration and does not request via the transaction interface a PLU code pick list for selection of a PLU code for the item. Along this workflow, the FV is produced for the image by the CNN model, sales data for the entered PLU code is obtained, and the FV and sales data are provided as input to the corresponding Bayesian inference module associated with the entered PLU code. When the returned confidence value falls below a verification threshold, produce verification manager 136 sends an alert to transaction manager 123. The alert causes transaction manager 123 to suspend the transaction and causes an attendant to be dispatched to the terminal 120 to inspect the item that was identified by the operator as being a produce item having the entered PLU code.

So, system 100 can be processed along a first workflow associated with providing a produce item pick list for an item under consideration for being a produce item by the operator, and system 100 can be processed along a second workflow when the operator does not use a picklist and enters their own PLU code for the item.

In an embodiment, system 100 can be processed along a third workflow associated with the first workflow. This occurs when the operator of terminal 120 requests a pick list for the item, but then enters a PLU code that is not included within the pick list as an option for the operator. This third workflow then triggers the second workflow for verification as to whether the item is non-produce item or a wrongly identified produce item by the operator.

The PLU code sales data is used to measure the popularity of each individual produce item as a factor for consideration by each Bayesian produce recognition engine 134 along with the item image. In this way, the system 100 produces recommendations that are in-line with the popularity of the produce being recommended. Intuitively, and all else being equal, commonly purchased fruits and vegetables are and should be prioritized over rarely purchased produce items. This sales data factor is a differentiating factor that allows the Bayesian produce recognition engines 134 to produce more accurate and precise confidence values (probabilities) for PLU codes under consideration for the transaction item.

Each PLU code of a given store or retailer has its own trained Bayesian produce recognition engine 134 trained on the FVs produced by the single CNN model and trained on sales data associated with the PLU code. This allows for more accurate probabilities or predictions as to what the item actually is. Moreover, the Bayesian produce recognition engines 134 can be processed in parallel and nearly simultaneously with each provided the FV and the sales data that matches its PLU code. In fact, experimentation has shown that the elapsed time from when a customer/operator requests a pick list until the system 100 presents the predicted pick list on terminal 120 back to the customer is approximately 250 milliseconds.

Figure 1B:
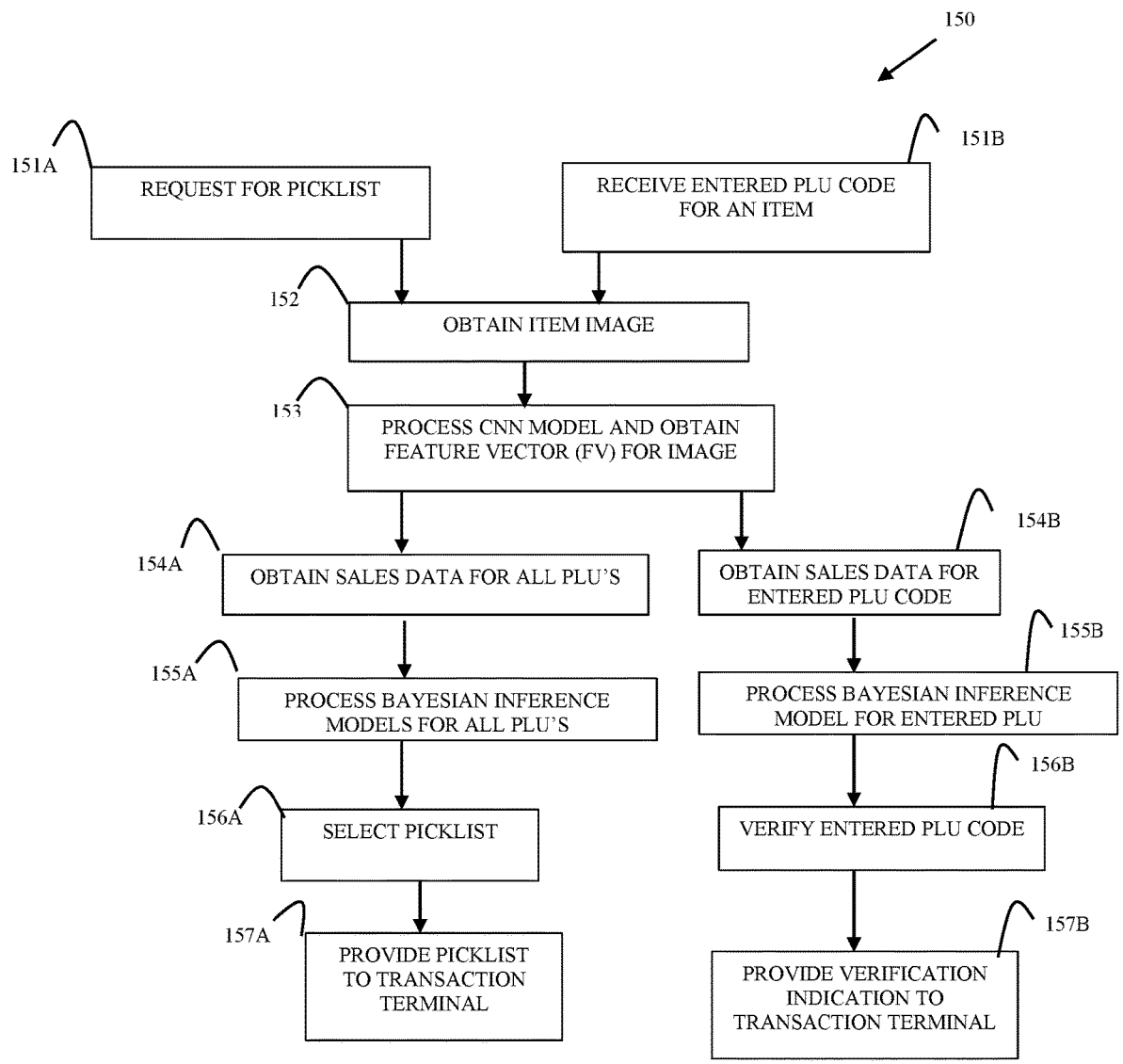
FIG. 1B is a diagram of a method for image-based produce recognition and verification, according to an example embodiment.

FIG. 1B is a diagram of a method 150 for image-based produce recognition and verification, according to an example embodiment.

Method 150 illustrates two workflows for system 100, a third workflow may also be processed as discussed below.

In the first workflow, at 151A, PLU identification manager 133 receives a request for a picklist during a transaction at terminal 120.

At 152, an image of the item associated with the request is obtained by PLU identification manager 133.

At 153, PLU identification manager 133 processes a CNN model providing the image as input and receiving as output a FV.

At 154A, PLU identification manager 133 obtains sales data for all available PLU codes of the given store or retailer.

At 155A, PLU identification manager 133 processes 134 for all available PLU codes providing each model with the FV and the corresponding sales data associated each model's PLU code.

At 156A, PLU assistance manager 135 determines a picklist based on the confidence values or probabilities returned by each of the Bayesian produce recognition engines 134.

At 157A, PLU assistance manager 135 provides the picklist to the transaction terminal 120 for presentation to an operator of terminal 120.

In the second workflow, at 151B, PLU identification manager 133 receives an entered PLU code for an item.

At 152, PLU identification manager 133 obtains an image captured of the item at the terminal 120.

At 153, PLU identification manager 133 provides the image as input to the CNN model and receives as output a FV for the image.

At 154B, PLU identification manager 133 obtains sales data corresponding to the entered PLU code.

At 155B, PLU identification manager 133 processes a Bayesian produce recognition engine 134 associated with the entered PLU code providing the FV and the corresponding entered PLU code sales data as input and receiving as output a probability that the original image captured of the item is or is not the entered PLU code.

At 156B, produce verification manager 136 determines from the probability wherein the entered PLU code is verified or is incorrect (wrong or counterfeit).

At 157B, produce verification manager 136 provides a verification indication to transaction terminal 120.

In a third workflow after 157A originating from the first workflow, PLU identification manager 133 receives an entered PLU code that is not one of the available options provided in the picklist back from terminal 120. In this workflow, 152-153 can be skipped since PLU identification manager 133 already has the item image the FV. Additionally, 154B and 155B can be skipped since this is known already after processing the first workflow. 156B and 157B are processed to determine if the entered PLU code is genuine or counterfeit.

FIG. 1C is a diagram of an equation 160 for a Bayesian Inference engine for image-based produce recognition and verification, according to an example embodiment.

The output FV from the CNN for the images of a produce item are provided to individual BIEs 134, each utilize an equation 150 as illustrated in FIG. 1C. The elements of the FV are summed and the sales data for each PLU summed and processed by each BIE 134 in accordance with the illustrated equation.

Each BIE 134 produces a probability that the provided FV and sales date for the corresponding image of the produce item is or is not the PLU associated with that BIE 134.

One now appreciates how more efficient and accurate produce item recognition and verification can be processed during a transaction with near instantaneous results returned to a transaction manager 123. A highly discriminative and low dimensional FV produced by a trained CNN for a given item image is processed by individual trained Bayesian produce recognition engines 134 along with sales data for available PLUs producing a set of probabilities. The probabilities can then be compared to predefined thresholds or ranges for purposes of producing a produce item pick list or verifying an entered PLU code during the transaction.

In an embodiment, system 100 can be entirely processed on terminal 120 such that items 133-136 reside on terminal 120, processed on a combination of terminal 120 and store/retailer server 140, or processed in various combinations of 120-140.

It is also to be noted that the item image discussed herein and above for a produce item may represent a bunch of or multiple ones of a single produce item type that is bagged in a clear bag or that is unbagged. The item image may also be a single produce item that is contained in a clear bag or unbagged.

The above-noted embodiments and other embodiments are now discussed with reference to FIGS. 2-3.

Figure 2:
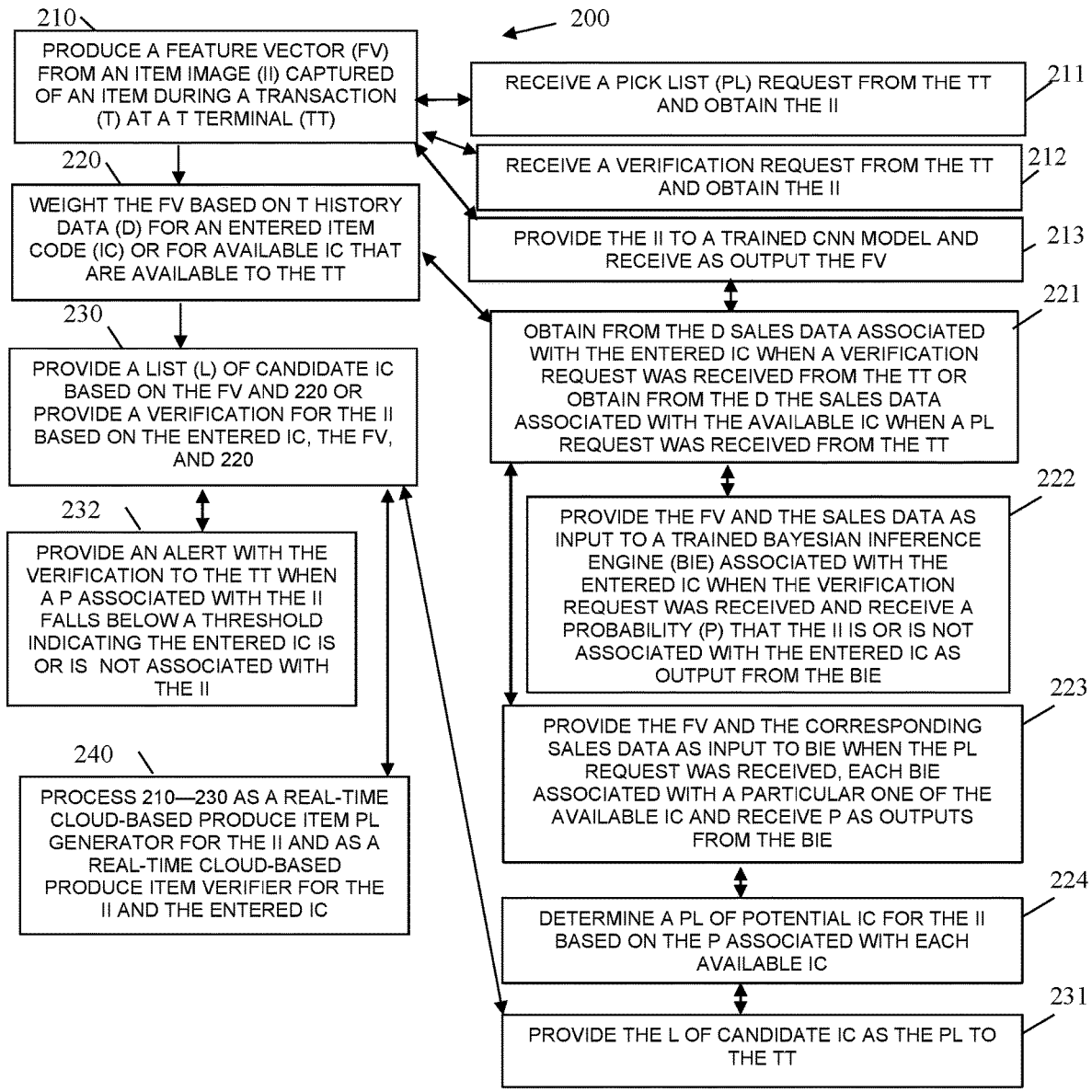
FIG. 2 is a diagram of another method for image-based produce recognition and verification, according to an example embodiment.

FIG. 2 is a diagram of a method 200 for image-based produce recognition and verification, according to an example embodiment. The software module(s) that implements the method 200 is referred to as a "produce item predictor and verifier." The produce item predictor and verifier is implemented as executable instructions programmed and residing within memory and/or a non-transitory computer-readable (processor-readable) storage medium and executed by one or more processors of a device or set of devices. The processor(s) of the device(s) that executes the produce item predictor and verifier are specifically configured and programmed to process the produce item predictor and verifier. The produce item predictor and verifier may have access to one or more network connections during its processing. The network connections can be wired, wireless, or a combination of wired and wireless.

In an embodiment, the produce item predictor and verifier executes on server 120. In an embodiment, the server 120 is one of multiple servers that logically cooperate as a single server representing a cloud processing environment (cloud 120).

In an embodiment, the produce item predictor and verifier is all or some combination of 133-136 and/or method 150 of FIG. 1B.

At 210, the produce item predictor and verifier produces a FV (highly discriminatory and low dimensional) from an item image captured of an item during a transaction at a transaction terminal.

In an embodiment, at 211, the produce item predictor and verifier receives a pick list request from the transaction terminal and obtains the item image.

In an embodiment, at 212, the produce item predictor and verifier receives a verification request from the transaction terminal and obtains the item image.

In an embodiment, at 213, the produce item predictor and verifier provides the item image to a trained CNN model and receives as output the FV.

At 220, the produce item predictor and verifier weights or factors the feature vector based on transaction history data for an entered item code or for all available item codes that are available for processing to or by the transaction terminal.

In an embodiment of 213 and 220, at 221, the produce item predictor and verifier obtains from the transaction history data sales data associated with the entered item code when a verification request was received from the transaction terminal or the produce item predictor and verifier obtains from the transaction history data the sales data associated with the available item codes when a pick list request was received from the transaction terminal.

In an embodiment of 221 at 222, the produce item predictor and verifier provides the feature vector and the sales data as input to a trained Bayesian inference engine associated with the entered item code when the verification request was received. The produce item predictor and verifier receives a single probability from the Bayesian inference engine as output. The single probability indicates whether the item image is or is not associated with or corresponds to the entered item code.

In an embodiment of 221 and at 223, the produce item predictor and verifier provides the feature vector and the corresponding sales data as input to a plurality of trained Bayesian inference engines. Each Bayesian inference engine associated with a particular one of the available item codes. The produce item predictor and verifier receives as outputs from the Bayesian inference engines a plurality of probabilities, each probability providing a likelihood that a given available item code is or is not associated with the item image.

In an embodiment of 223 and at 224, the produce item predictor and verifier determines a pick list of potential item codes for the item image based on the probabilities associated with each available item code. For example, only a top preconfigured percentage of available item codes are selected based on their assigned probabilities for including in the pick list or any available item code that exceeds a predefined probability is assigned to the pick list.

At 230, the produce item predictor and verifier provides a list of candidate item codes based on the feature vector and the weighting of 220, or the produce item predictor and verifier provides a verification for the item image based on the entered item code, the feature vector and the weighting of 220.

In an embodiment of 224 and 230, at 231, the produce item predictor and verifier provides the list of candidate item codes as the generated pick list to the transaction terminal.

In an embodiment, at 232, the produce item predictor and verifier provides an alert with the verification to the transaction terminal when a probability associated with the item image falls below a threshold indicating that the entered item code is or is not associated with the item image.

In an embodiment, at 232, the produce item predictor and verifier is processed as a cloud-based produce item pick list generator/predictor for the item image and as a real-time cloud-based produce item verifier for the item image and the entered item code.

Figure 3:
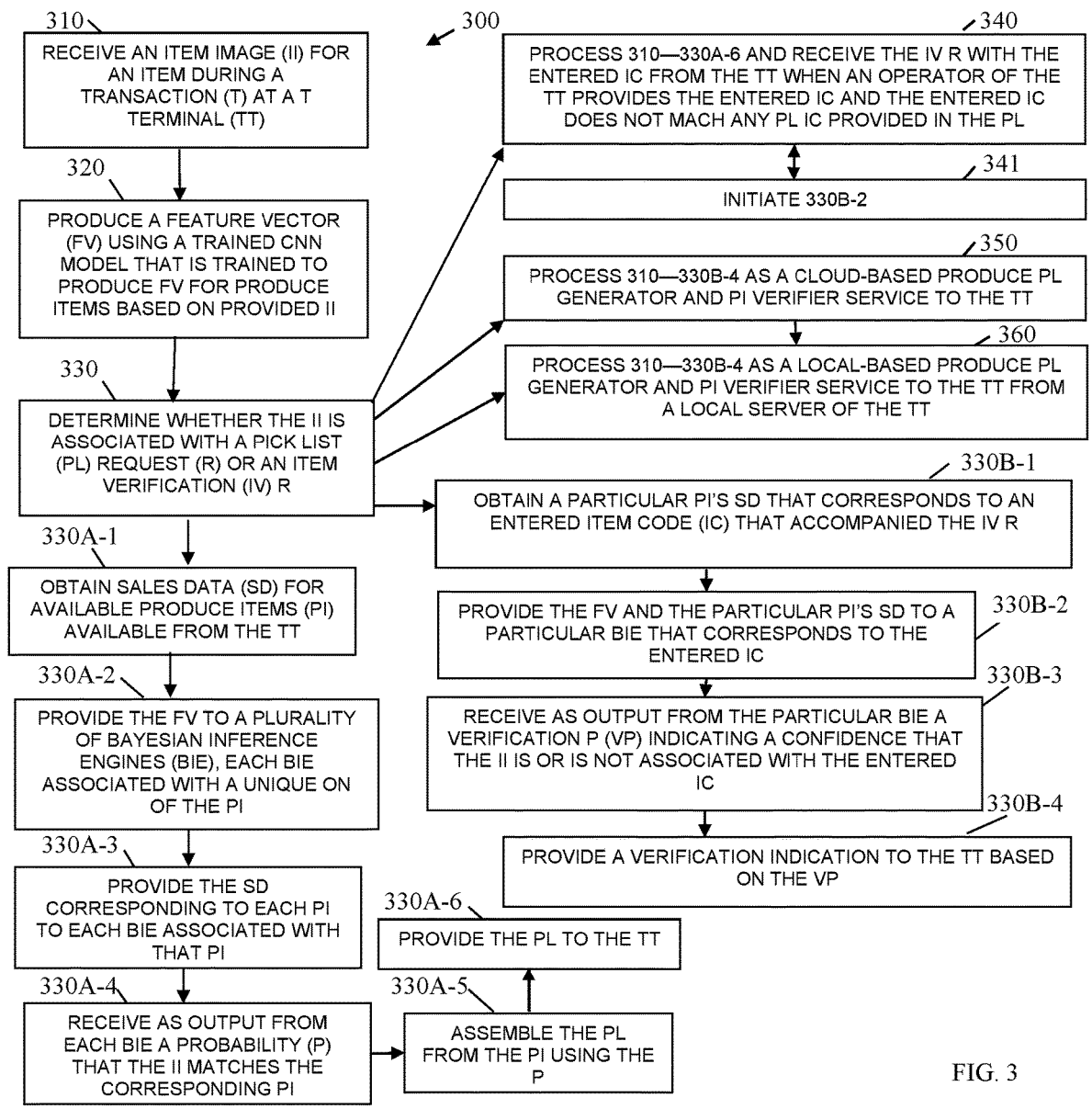
FIG. 3 is a diagram of still another method for image-based produce recognition and verification, according to an example embodiment

FIG. 3 is a diagram of a method 300 for image-based produce recognition and verification, according to an example embodiment. The software module(s) that implements the method 300 is referred to as a "produce item pick list predictor and verification manager." The produce item pick list predictor and verification manager is implemented as executable instructions programmed and residing within memory and/or a non-transitory computer-readable (processor-readable) storage medium and executed by one or more processors of a device or set of devices. The processor(s) of the device that executes the produce item pick list predictor and verification manager are specifically configured and programmed to process the produce item pick list predictor and verification manager. The produce item pick list predictor and verification manager may have access to one or more network connections during its processing. The network connections can be wired, wireless, or a combination of wired and wireless.

In an embodiment, the device that executes the produce item pick list predictor and verification manager is server 120. In an embodiment, server 120 is one of multiple servers that cooperate and logically present as a single server associated with a cloud processing environment (cloud 120).

In an embodiment, the produce item pick list predictor and verification manager is all of, or some combination of, 133-136, method 150 of FIG. 1B, and/or method 200 of FIG. 2.

The produce item pick list predictor and verification manager represents another and, in some ways, an enhanced processing perspective of what was discussed above for the method 150 and the method 200.

At 310, the produce item pick list predictor and verification manager receives an item image for an item during a transaction at a transaction terminal.

At 320, the produce item pick list predictor and verification manager produces or generates a feature vector using a trained CNN model that is trained to produce FVs for produce items based on provided item images.

At 330, the produce item pick list predictor and verification manager determines whether the item image is associated with a pick list request or is associated with an item verification request.

Based on the type of request, two workflows are processed by the produce item pick list predictor and verification manager. The first workflow is identified in 330A-1 to 330A-6 and the second workflow is identified in 330B-1 to 330B-4.

For the first workflow (when a pick list request was associated with the item image), at 330A-1, the produce item pick list predictor and verification manager obtains sales data for available produce items that are available or accessible to the transaction terminal for transactions conducted at the transaction terminal (e.g., all existing produce item codes sold by a retailer associated with the transaction terminal).

At 330A-2, the produce item pick list predictor and verification manager provides the feature vector to a plurality of Bayesian inference engines. Each Bayesian inference engine associated with a unique one of the available produce items and its corresponding PLU code.

At 330A-3, the produce item pick list predictor and verification manager provides the sales data corresponding to each produce item to each of the corresponding Bayesian inference engines associated with that produce item. That is, each trained Bayesian inference engine is trained on FVs and sales data that corresponds to a specific PLU (produce item) code.

It is noted that both the FV and the corresponding sales data can be provided together to the corresponding Bayesian inference engines. Further, the Bayesian inference engines may be processed in parallel with one another for concurrent processing of the engines.

At 330A-4, the produce item pick list predictor and verification manager receives as outputs from each of the engines a probability that the item image matches or corresponds to the produce item associated with each of the engines. That is, each engine provides as output a single probability, such that produce item pick list predictor and verification manager receives a plurality of probabilities, each probability associated with a specific produce item under consideration as a match to the item image.

It is also to be noted that the engines do not operate off the item image; rather, the engines operate off of the FV and the sales data for the produce item associated with a given engine.

At 330A-5, the produce item pick list predictor and verification manager assembles the picklist from the produce items using the probabilities. For example, any PLU code having probability that exceeds a predefined probability within the list of probabilities returned as outputs from the engines is included in the pick list. Or, a top predefined amount or percentage of probabilities are retained, and their PLU codes are used to assemble or generate the pick list.

At 330A-6, the produce item pick list predictor and verification manager provides the pick list to the transaction terminal in real-time during the transaction.

It is noted again that experiments have demonstrated that the entire amount of round-trip time from when an operator of the transaction terminal requests a pick list and the return of the pick list to the transaction terminal is approximately 250 milliseconds.

During the second workflow (when the item verification request and an entered code is provided with the item image by the transaction terminal), at 330B-1, the produce item pick list predictor and verification manager obtains a particular produce item's sales data that corresponds to an entered item code that accompanied the item verification request.

At 330B-2, the produce item pick list predictor and verification manager provides the feature vector and the particular produce item's sales data to a particular engine that corresponds to the entered item code.

At 330B-3, the produce item pick list predictor and verification manager receives as output from the particular engine a verification probability (single probability) indicating a confidence that the item image is or is not associated with the entered item code.

At 330B-4, the produce item pick list predictor and verification manager provides a verification indication to the transaction terminal based on the verification probability. For example, when the verification probability is below 90%, the produce item pick list predictor and verification manager may send the verification indication as a potential counterfeit item. When the verification probability is below 50%, the produce item pick list predictor and verification manager sends the verification indication as a likely counterfeit item. When the verification probability is below 20%, the produce item pick list predictor and verification manager sends the verification indication as a counterfeit item detected or non-produce item detected. This is configurable based on a scale and range of alerts that the transaction terminal or a transaction system associated with the transaction terminal is configured to process in a workflow based on the verification indication provided by the produce item pick list predictor and verification manager.

In an embodiment, the produce item pick list predictor and verification manager may process a third workflow that comprises the first workflow 330A-1 to 330A-6 and a portion of the second workflow 330B-2-330B-4.

For example, at 340, the produce item pick list predictor and verification manager has processed the first workflow 310-330A-6 to provide an operator of the transaction terminal a pick list prediction for the item image, the operator then provides an entered item code but the entered item code does not match any of the original PLU codes provided in the pick list at 330A-6. Assuming, the produce item pick list predictor and verification manager caches or buffers information processed for the transaction until the transaction concludes at the transaction terminal, the item image, the FV, and the sales data are available already, such that at 341, the produce item pick list predictor and verification manager immediately initiates processing for the item verification request at 330B-2. It is also noted, that the output probabilities provided by the engines during the first workflow 330A-1 to 330A-6 may have also been cached, such that 330B-2 becomes unnecessary as well, in this case, the produce item pick list predictor and verification manager initiates processing after 340 at 330B-4.

In an embodiment, at 350, the produce item pick list predictor and verification manager is provided and processes as a cloud-based produce pick list generator and a produce item verification service available to the transaction terminal as a cloud-based service.

In an embodiment, at 360, the produce item pick list predictor and verification manager is provided and processes as local-based pick list generator and produce item verification service available to the transaction terminal from a local server or Local-Area Network (LAN).

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving, by a processor of a server, item images of an item captured by cameras during a transaction at a transaction terminal, wherein receiving further includes receiving at least one of the item images from a certain overhead camera of the cameras, wherein the certain overhead camera is focused down on a top surface of a weigh scale and provides the at least one of the item images when an item is placed on the weigh scale during the transaction;

producing, by the processor, a feature vector based on the item images, image captured of an item by cameras during a transaction at a transaction terminal, wherein at least one item image captured by an overhead camera of a weigh scale for the transaction terminal with the item placed on the weigh scale during the transaction, wherein producing further includes processing the item images using a trained Convolutional Neural Network (CNN) model to generate the feature vector, wherein the trained CNN model is configured to output a low-dimensionally, discriminative feature vector for produce items, and wherein the trained CNN model and Bayesian produce recognition engines are leveraged across a plurality of disparate retailers and a plurality of stores associated with each retailer for purposes of identifying and verifying the produce items during transactions at terminals;

wherein the Bayesian produce recognition engines each utilize an equation that sums elements of the feature vector and sales data for each Produce Look Up (PLU) code to produce a probability that the feature vector and sales data for a corresponding image of a particular produce item is or is not the PLU code associated with a corresponding Bayesian produce recognition engine;

weighting, by the processor, the feature vector based on transaction history data for an entered item code received from the transaction terminal for the item or for available item codes that are available to the transaction terminal; and providing, by the processor, a list of candidate item codes based on the feature vector and the weighting and iterating back to producing the feature vector when a specific item code that is not included in the list of candidate item codes is provided by an operator of the transaction terminal or providing a verification for the item based on the entered item code or the specific item code selected by the operator, the feature vector, and the weighting.

2. The method of claim 1, wherein producing further includes receiving a pick list request from the transaction terminal and obtaining the item images from the cameras.

3. The method of claim 1, wherein producing further includes receiving a verification request from the transaction terminal for the entered item code and obtaining the item images from the cameras.

4. The method of claim 1, wherein weighting further includes obtaining from the transaction history data, sales data associated with the entered item code when a verification request was received from the transaction terminal or obtaining from the transaction history data the sales data associated with the available item codes when a pick list request was received from the transaction terminal.

5. The method of claim 4, wherein obtaining further includes providing the feature vector and the sales data as input to a trained Bayesian inference engine associated with the entered item code when the verification request was received and receiving a probability that the item images are or are not associated with the entered item code as output from the trained Bayesian inference engine.

6. The method of claim 4, wherein obtaining further includes providing the feature vector and corresponding sales data as input to the Bayesian produce recognition engines when the pick list request was received, each trained Bayesian inference engine associated with a particular one of the available item codes and receiving probabilities as outputs from the Bayesian produce recognition engines.

7. The method of claim 6, wherein providing the feature vector and the corresponding sales data further includes determining a pick list of potential item codes for the item images based on the probabilities associated with each of the available item codes.

8. The method of claim 7, wherein providing the list of candidate item codes as the pick list of potential item codes to the transaction terminal.

9. The method of claim 1, wherein providing the verification further includes providing an alert with the verification to the transaction terminal when a probability associated with the item images fall below a threshold indicating that the entered item code is not associated with item images.

10. The method of claim 1 further comprising, processing, by the processor, the method as a real-time cloud-based produce item pick list generator for the item images and as a real-time cloud-based produce item verifier for the item images and the entered item code.

11. A method, comprising:

receiving, by a processor of a server, item images for an item captured by cameras during a transaction at a transaction terminal, wherein receiving further includes receiving at least one of the item images captured by a certain overhead camera of the cameras, wherein the certain overhead camera is focused down on a top surface is of a weigh scale associated with the transaction terminal to provide the at least one of the item images when the item is placed on the weigh scale during the transaction;

producing, by a processor of a server, a feature vector using a trained Convolutional Neural Network model that is trained to produce feature vectors for produce items based on provided item images, wherein producing further includes processing the trained Convolutional Neural Network model using the item images for the item and obtaining the feature vector as output from the trained Convolutional Neural Network model;

wherein the feature vector is a low-dimensional, discriminative feature vector;

determining, by a processor of a server, whether the item images are associated with a pick list request or an item verification request;

when the item images are associated with the pick list request:

obtaining, by a processor of a server, sales data for available produce items available from the transaction terminal;

providing, by a processor of a server, the feature vector to a plurality of trained Bayesian Inference Engines (BIE), each BIE associated with a unique one of the available produce items;

providing, by a processor of a server, the sales data corresponding to each available produce item to each BIE associated with that available produce item;

receiving, by a processor of a server, as output from each of the BIE a probability that the item images match a corresponding available produce item;

assembling, by a processor of a server, a pick list from the available produce items using the probabilities; and providing, by a processor of a server, the pick list to the transaction terminal;

when the item images are associated with the item verification request:

obtaining, by a processor of a server, a particular produce item's sales data that corresponds to an entered item code that accompanied the item verification request;

providing, by a processor of a server, the feature vector and the particular produce item's sales data to a particular BIE that corresponds to the entered item code;

receiving, by a processor of a server, as output from the particular BIE a verification probability indicating a confidence that the item images are or are not associated with the entered item code; and providing, by a processor of a server, a verification indication to the transaction terminal based on the verification probability.

12. The method of claim 11 further comprising, processing, by a processor of a server, the method to produce the pick list based on receiving the pick list request with the item images and receiving the item verification request with the entered item code from the transaction terminal when an operator of the transaction terminal provides the entered item code and the entered item code does not match any of pick list item codes provided in the pick list.

13. The method of claim 12, wherein processing further includes initiating, after receiving the item verification request, processing at the providing of the feature vector and the particular produce item's sales data to a particular BIE that corresponds to the entered item code.

14. The method of claim 11 further comprising, processing, by a processor of a server, the method as a cloud-based produce pick list generator and produce item verifier service available to the transaction terminal.

15. The method of claim 11 further comprising, processing, by a processor of a server, the method as a local-based produce pick list generator and produce item verifier service available to the transaction terminal from a local server of the transaction terminal.

* * * * *